(12) United States Patent
Lee

(10) Patent No.: US 12,517,532 B2
(45) Date of Patent: Jan. 6, 2026

(54) SEMICONDUCTOR DEVICE

(71) Applicant: SK hynix Inc., Icheon-si (KR)

(72) Inventor: Se Won Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 135 days.

(21) Appl. No.: 18/185,212

(22) Filed: Mar. 16, 2023

(65) Prior Publication Data

US 2024/0160235 A1    May 16, 2024

(30) Foreign Application Priority Data

Nov. 11, 2022  (KR) .................. 10-2022-0150823

(51) Int. Cl.
*G05F 1/46*        (2006.01)

(52) U.S. Cl.
CPC .............. *G05F 1/468* (2013.01); *G05F 1/465* (2013.01)

(58) Field of Classification Search
None
See application file for complete search history.

(56) References Cited

U.S. PATENT DOCUMENTS

| | | | |
|---|---|---|---|
| 8,653,884 B2 * | 2/2014 | Miwa | G05F 3/02 307/64 |
| 9,343,966 B1 * | 5/2016 | Thakur | H02M 3/156 |
| 9,625,924 B2 | 4/2017 | Atallah et al. | |
| 9,742,209 B2 * | 8/2017 | Fernald | G06F 1/3243 |
| 9,893,607 B1 * | 2/2018 | Wan | H02M 1/36 |
| 11,460,902 B2 * | 10/2022 | Grant | G06F 1/3287 |
| 2008/0084195 A1 * | 4/2008 | Frew | G06F 1/305 323/282 |
| 2011/0157976 A1 * | 6/2011 | Kuriyama | G11C 16/30 327/540 |
| 2016/0111134 A1 * | 4/2016 | Kim | G11C 5/143 365/226 |
| 2016/0308372 A1 * | 10/2016 | Kolla | H02J 4/00 |

FOREIGN PATENT DOCUMENTS

KR      1020190010442 A      1/2019

* cited by examiner

*Primary Examiner* — Thomas J. Hiltunen
(74) *Attorney, Agent, or Firm* — WILLIAM PARK AND ASSOCIATES LTD.

(57) ABSTRACT

A semiconductor device includes a voltage supply circuit including a first pad to which a first source voltage that is generated from an external power source is applied and a second pad to which a second source voltage that is generated from the external power source is applied and configured to generate an internal voltage based on at least one of the first source voltage and the second source voltage and an internal voltage supply circuit configured to generate the internal voltage by supplying less than all of the second source voltage to the first source voltage when a level of the second source voltage is a set voltage level or higher, when generating the internal voltage based on the first source voltage.

15 Claims, 13 Drawing Sheets

SEMICONDUCTOR DEVICE

CROSS-REFERENCE TO RELATED APPLICATION

The present application claims priority under 35 U.S.C. § 119(a) to Korean application number 10-2022-0150823, filed in the Korean Intellectual Property Office on Nov. 11, 2022, the entire disclosure of which is incorporated herein by reference.

BACKGROUND

1. Technical Field

Various embodiments generally relate to a semiconductor device, and more particularly to a semiconductor device in which a leakage current that is generated when an internal voltage is generated from a source voltage is used in the internal voltage.

2. Related Art

A semiconductor device that is embedded in a portable electronic device selectively uses a source voltage depending on an operating frequency by performing a dynamic voltage frequency scaling (DVFS) operation in order to prevent power from being unnecessarily consumed.

A semiconductor device can reduce power consumption in an internal circuit by performing a high speed operation by receiving a source voltage having a high voltage level when an operating frequency is high and performing a low speed operation by receiving a source voltage having a low voltage level when the operating frequency is low.

SUMMARY

In an embodiment, a semiconductor device may include a voltage supply circuit including a first pad to which a first source voltage that is generated from an external power source is applied and a second pad to which a second source voltage that is generated from the external power source is applied and configured to generate an internal voltage based on at least one of the first source voltage and the second source voltage and an internal voltage supply circuit configured to generate the internal voltage by supplying less than all of the second source voltage to the first source voltage when a level of the second source voltage is a set voltage level or higher, when generating the internal voltage based on the first source voltage.

In an embodiment, a semiconductor device may include a voltage supply circuit including a first pad to which a first source voltage is applied and a second pad to which a second source voltage is applied and configured to supply an internal circuit with an internal voltage that is generated based on one of the first source voltage and the second source voltage and an internal voltage supply circuit configured to detect the second source voltage according to a dynamic voltage frequency scaling (DVFS) operation and configured to supply less than all of the second source voltage to the first source voltage when a level of the second source voltage is a set voltage level or higher.

In an embodiment, a semiconductor device may include a voltage supply circuit including a first pad to which a first source voltage is applied and a second pad to which a second source voltage is applied and configured to supply an internal circuit with an internal voltage that is generated based on one of the first source voltage and the second source voltage and an internal voltage control circuit configured to detect the second source voltage according to a dynamic voltage frequency scaling (DVFS) operation and configured to discharge, to a ground voltage, charges that are supplied to the second source voltage when a level of the second source voltage is a set voltage level or higher.

DETAILED DESCRIPTION

Figure 1:
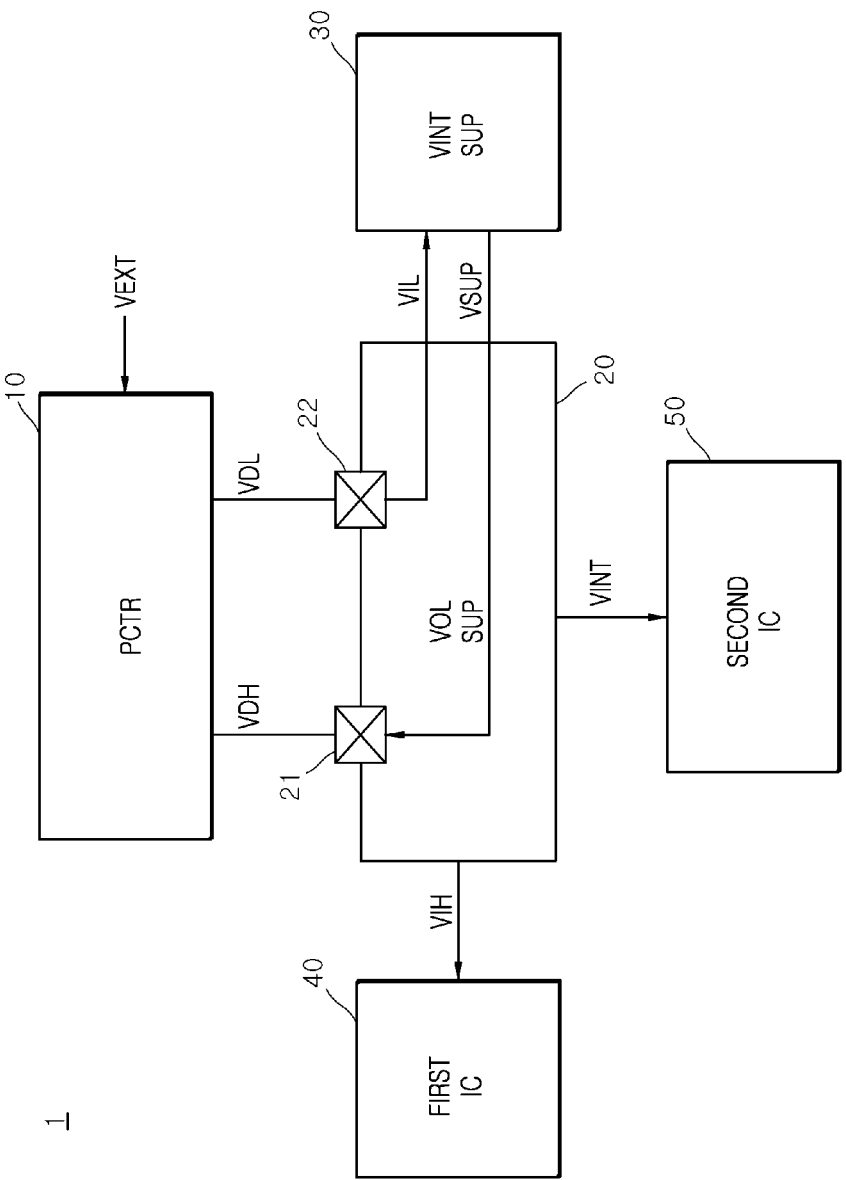
FIG. 1 is a block diagram illustrating a construction of a semiconductor device according to an embodiment of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. On the other hand, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the present disclosure will be described in more detail through embodiments. The embodiments are only used to exemplify the present disclosure, and the scope of the present disclosure is not limited by the embodiments.

An embodiment of the present disclosure provides a semiconductor device which generates an internal voltage from a source voltage having a high voltage level and a supply voltage when a dynamic voltage frequency scaling (DVFS) operation is deactivated and generates the internal voltage from the source voltage having a low voltage level when the DVFS operation is activated.

In an embodiment of the present disclosure a semiconductor device is provided which generates the internal voltage from a source voltage and the supply voltage that is generated by a leakage current when a DVFS operation is deactivated.

In an embodiment of the present disclosure a semiconductor device is provided which selectively supplies an internal circuit with the internal voltage having a high voltage level and the internal voltage having a low voltage level depending on whether a DVFS operation is performed.

In an embodiment of the present disclosure a semiconductor device is provided which discharges, to a ground voltage, charges that are supplied to a source voltage that is generated by a leakage current if the source voltage is generated at a set voltage level or higher when a DVFS operation is deactivated.

In an embodiment of the present disclosure, the embodiment has an effect in that the internal voltage can be generated from the source voltage having a high voltage level and the supply voltage when a DVFS operation is deactivated and the internal voltage can be generated from the source voltage having a low voltage level when the DVFS operation is activated.

In an embodiment of the present disclosure, the embodiment also has an effect in that an internal voltage can be generated from a source voltage and the supply voltage that is generated by a leakage current when a DVFS operation is deactivated and the leakage current can be used in the internal voltage.

In an embodiment of the present disclosure, the embodiment also has an effect in that current consumption can be decreased by selectively supplying an internal circuit with the internal voltage having a high voltage level and the internal voltage having a low voltage level depending on whether a DVFS operation is performed.

In an embodiment of the present disclosure, the embodiment also has an effect in that an abnormal operation can be prevented or mitigated by discharging, to a ground voltage, charges that are supplied to the source voltage that is generated by a leakage current if the source voltage is generated at a set voltage level or higher when a DVFS operation is deactivated.

As illustrated in FIG. 1, a semiconductor device 1 according to an embodiment of the present disclosure may include a power control circuit (PCTR) 10, a voltage supply circuit (VOL SUP) 20, an internal voltage supply circuit (VINT SUP) 30, a first internal circuit (FIRST IC) 40, and a second internal circuit (SECOND IC) 50.

The power control circuit 10 may generate a first source voltage VDH and a second source voltage VDL from an external power source VEXT that is supplied from the outside. The power control circuit 10 may generate the first source voltage VDH and the second source voltage VDL by reducing the level of the external power source VEXT that is supplied from the outside. The first source voltage VDH may be set as a voltage that is supplied in order for the semiconductor device 1 to perform a high speed operation. The second source voltage VDL may be set as a voltage that is supplied in order for the semiconductor device 1 to perform a low speed operation. For example, and not limited to, the first source voltage VDH may be set as a voltage that is supplied as 1.1 V in order for the semiconductor device 1 to perform a high speed operation. For example, and not limited to, the second source voltage VDL may be set as a voltage that is supplied as 0.95 V in order for the semiconductor device 1 to perform a low speed operation. The first source voltage VDH may be generated as a voltage having a voltage level that is greater than or equal to the second source voltage VDL. In some embodiments, the first source voltage VDH and the second source voltage VDL may be generated to have various voltage levels. The external power source VEXT may be set as a voltage that is supplied by a device, such as a power management integrated circuit (PMIC). The external power source VEXT may be set as various voltages that are supplied from the outside of the semiconductor device 1. In some embodiments, the power control circuit 10 may be implemented as the PMIC.

The voltage supply circuit 20 may include a first pad 21 and a second pad 22. The first pad 21 may receive the first source voltage VDH. The second pad 22 may receive the second source voltage VDL. The voltage supply circuit 20 may generate a first input voltage VIH by receiving the first source voltage VDH and a supply voltage VSUP through the first pad 21. The voltage supply circuit 20 may supply the first input voltage VIH to the first internal circuit 40. The voltage supply circuit 20 may generate a second input voltage VIL by receiving the second source voltage VDL through the second pad 22. The voltage supply circuit 20 may supply the second input voltage VIL to the internal voltage supply circuit 30. The voltage supply circuit 20 may generate the internal voltage VINT based on at least any one of the first source voltage VDH and the second source voltage VDL. The voltage supply circuit 20 may supply the internal voltage VINT to the second internal circuit 50. The voltage supply circuit 20 may generate the internal voltage VINT based on the first source voltage VDH when a DVFS operation is deactivated. The voltage supply circuit 20 may generate the internal voltage VINT based on the second source voltage VDL when the DVFS operation is activated.

The DVFS operation may be set as an operation of selectively supplying the second internal circuit 50 with a high source voltage and a low source voltage depending on an operating frequency of the second internal circuit 50 that is included in the semiconductor device 1. When the DVFS operation is deactivated, the voltage supply circuit 20 may generate the internal voltage VINT based on the first source voltage VDH having a high voltage level and the supply voltage VSUP, and may supply the internal voltage VINT to the second internal circuit 50. When the DVFS operation is activated, the voltage supply circuit 20 may generate the internal voltage VINT based on the second source voltage VDL having a low voltage level, and may supply the internal voltage VINT to the second internal circuit 50.

If the level of the second source voltage VDL is a set voltage level or higher when the voltage supply circuit 20 generates the internal voltage VINT based on the first source voltage VDH, the internal voltage supply circuit 30 may supply less than all of the second source voltage VDL to the first source voltage VDH. The internal voltage supply circuit 30 may detect the second source voltage VDL when the voltage supply circuit 20 generates the internal voltage VINT based on the first source voltage VDH, and may supply less than all of the second source voltage VDL to the first source voltage VDH when the level of the second source voltage VDL is a set voltage level or higher. If the level of the second source voltage VDL is a set voltage level or higher when a DVFS operation is deactivated, the internal voltage supply circuit 30 may generate the supply voltage VSUP from a part of the second source voltage VDL, and may supply the supply voltage VSUP to the first pad 21. If the level of the second input voltage VIL that is generated from the second source voltage VDL is a set voltage level or higher when the DVFS operation is deactivated, the internal voltage supply circuit 30 may generate the supply voltage VSUP by boosting the second input voltage VIL, and may supply the supply voltage VSUP to the first pad 21. During an operation of the voltage supply circuit 20 generating the internal voltage VINT from the first source voltage VDH, the voltage level of the second pad 22 may rise due to a leakage current. If the voltage level of the second pad 22 is raised by a leakage current and the level of the second input voltage VIL that is generated from the second source voltage VDL is a set voltage level or higher, the internal voltage supply circuit 30 may generate the supply voltage VSUP by boosting the second input voltage VIL, and may supply the supply voltage VSUP to the first pad 21.

The first internal circuit 40 may be implemented as a memory circuit that performs an operation by receiving the first input voltage VIH. The first internal circuit 40 may perform a high speed operation by receiving the first input voltage VIH regardless of a DVFS operation.

The second internal circuit 50 may be implemented as a memory circuit that performs an operation by receiving the internal voltage VINT. The second internal circuit 50 may perform an operation by receiving the internal voltage VINT that is generated from the first source voltage VDH and the supply voltage VSUP when a DVFS operation is deactivated. The second internal circuit 50 may perform a high speed operation by receiving the internal voltage VINT that has a voltage level generated at a high voltage level from the first source voltage VDH and the supply voltage VSUP when the DVFS operation is deactivated. The second internal circuit 50 may perform an operation by receiving the internal voltage VINT that is generated from the second source voltage VDL when the DVFS operation is activated. The second internal circuit 50 may perform a low speed operation by receiving the internal voltage VINT that has a voltage level generated at a low voltage level from second source voltage VDL when the DVFS operation is activated.

As described above, the semiconductor device 1 may generate the internal voltage VINT from the first source voltage VDH having a high voltage level and the supply voltage VSUP when a DVFS operation is deactivated. The semiconductor device 1 may generate the internal voltage VINT from the second source voltage VDL having a low voltage level when a DVFS operation is activated. The semiconductor device 1 may generate the internal voltage VINT from the first source voltage VDH and the supply voltage VSUP that is generated by a leakage current, when a DVFS operation is deactivated, and may use the leakage current in the internal voltage VINT. In an embodiment, the semiconductor device 1 can reduce current consumption by selectively supplying an internal circuit with the internal voltage VINT having a high voltage level and the internal voltage VINT having a low voltage level depending on whether a DVFS operation is performed.

Figure 2:
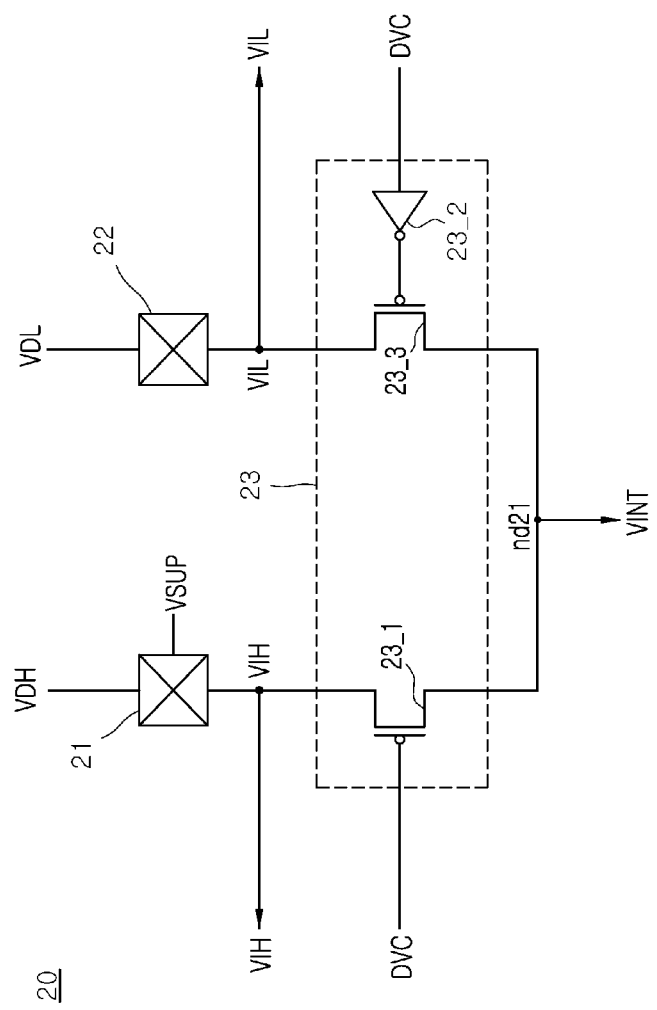
FIG. 2 is a circuit diagram illustrating a construction according to an embodiment of a voltage supply circuit that is included in the semiconductor device illustrated in FIG. 1.

FIG. 2 is a circuit diagram illustrating a construction according to an embodiment of the voltage supply circuit 20 that is included in the semiconductor device 1. The voltage supply circuit 20 may include the first pad 21, the second pad 22, and a switch circuit 23.

The first pad 21 may receive the first source voltage VDH. The first pad 21 may generate the first input voltage VIH by receiving the first source voltage VDH and the supply voltage VSUP. The first input voltage VIH may be supplied to the first internal circuit 40.

The second pad 22 may receive the second source voltage VDL. The second pad 22 may generate the second input voltage VIL by receiving the second source voltage VDL. The second input voltage VIL may be supplied to the internal voltage supply circuit 30.

The switch circuit 23 may be implemented by using a PMOS transistor 23_1, an inverter 23_2, and a PMOS transistor 23_3.

The PMOS transistor 23_1 may be connected between the first pad 21 and a node nd21. The PMOS transistor 23_1 may be turned on when the level of the power control signal DVC is disabled to a logic low level. The PMOS transistor 23_1 may be turned on by a power control signal DVC having a logic low level when a DVFS operation is deactivated. The PMOS transistor 231 may generate the internal voltage VINT by outputting the first input voltage VIH to the node nd21 when the level of the power control signal DVC is disabled to a logic low level. The power control signal DVC may be set as a signal the level of which is disabled to a logic low level when the DVFS operation is deactivated and the level of which is enabled to a logic high level when the DVFS operation is activated.

The inverter 23_2 may output the power control signal DVC by inverting the power control signal DVC.

The PMOS transistor 23_3 may be connected between the second pad 22 and the node nd21. The PMOS transistor 23_3 may be turned on when the level of the output signal of the inverter 23_2 is disabled to a logic low level. The PMOS transistor 23_3 may be turned on by the output signal of the inverter 23_2 having a logic low level when a DVFS operation is activated. The PMOS transistor 23_3 may generate the internal voltage VINT by outputting the second input voltage VIL to the node nd21 when the level of the output signal of the inverter 23_2 is disabled to a logic low level.

Figure 3:
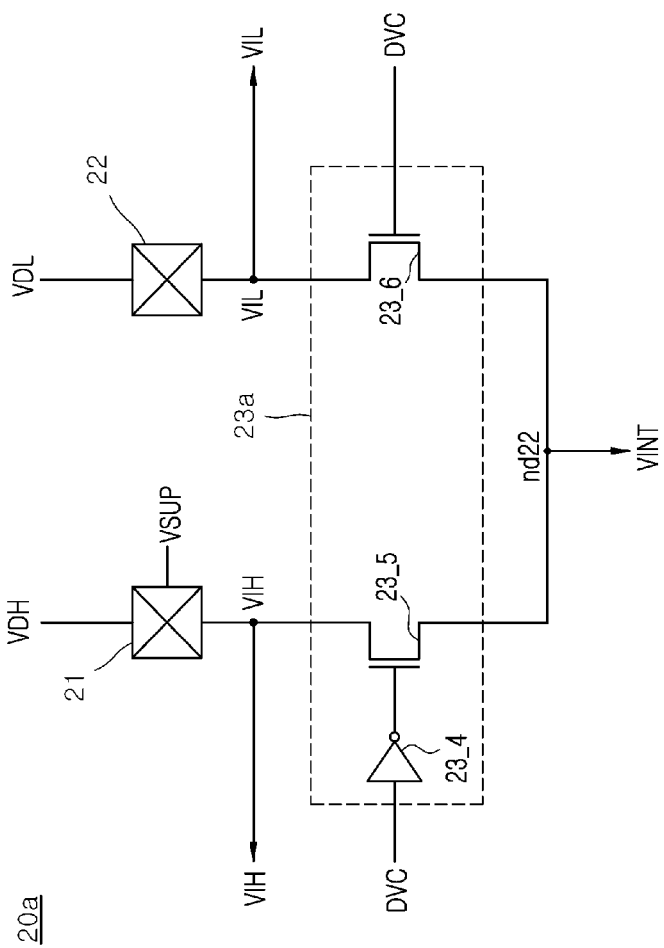
FIG. 3 is a circuit diagram illustrating a construction according to another embodiment of the voltage supply circuit that is included in the semiconductor device illustrated in FIG. 1.

FIG. 3 is a circuit diagram illustrating a construction according to another embodiment of the voltage supply circuit 20 that is included in the semiconductor device 1. A voltage supply circuit 20*a* may include the first pad 21, the second pad 22, and a switch circuit 23*a*.

The first pad 21 may receive the first source voltage VDH. The first pad 21 may generate the first input voltage VIH by receiving the first source voltage VDH and the supply voltage VSUP. The first input voltage VIH may be supplied to the first internal circuit 40.

The second pad 22 may receive the second source voltage VDL. The second pad 22 may generate the second input voltage VIL by receiving the second source voltage VDL. The second input voltage VIL may be supplied to the internal voltage supply circuit 30.

The switch circuit 23*a* may be implemented by using an inverter 234, an NMOS transistor 235, and an NMOS transistor 23_6.

The inverter 23_4 may output the power control signal DVC by inverting.

The NMOS transistor 23_5 may be connected between the first pad 21 and a node nd22. The NMOS transistor 23_5 may be turned on when the output signal of the inverter 23_4 is enabled to a logic high level. The NMOS transistor 235 may be turned on by the output signal of the inverter 23_4 having a logic high level when a DVFS operation is deactivated. The NMOS transistor 235 may generate the internal voltage VINT by outputting the first input voltage VIH to the node nd22 when the level of the output signal of the inverter 23_4 is enabled to a logic high level. The power control signal DVC may be set as a signal the level of which is disabled to a logic low level when the DVFS operation is deactivated and the level of which is enabled to a logic high level when the DVFS operation is activated.

The NMOS transistor 23_6 may be connected between the second pad 22 and the node nd22. The NMOS transistor 23_6 may be turned on when the level of the power control signal DVC is enabled to a logic high level. The NMOS transistor 23_6 may be turned on by the power control signal DVC having a logic high level when a DVFS operation is activated. The NMOS transistor 236 may generate the internal voltage VINT by outputting the second input voltage VIL to the node nd22 when the level of the power control signal DVC is enabled to a logic high level.

The voltage supply circuit 20*a* illustrated in FIG. 3 may perform the same operation as the voltage supply circuit 20 illustrated in FIG. 2 except that the NMOS transistors 23_5 and 23_6 of the voltage supply circuit 20*a* are implemented instead of the PMOS transistors 23_1 and 23_3 of the voltage supply circuit 20.

Figure 4:
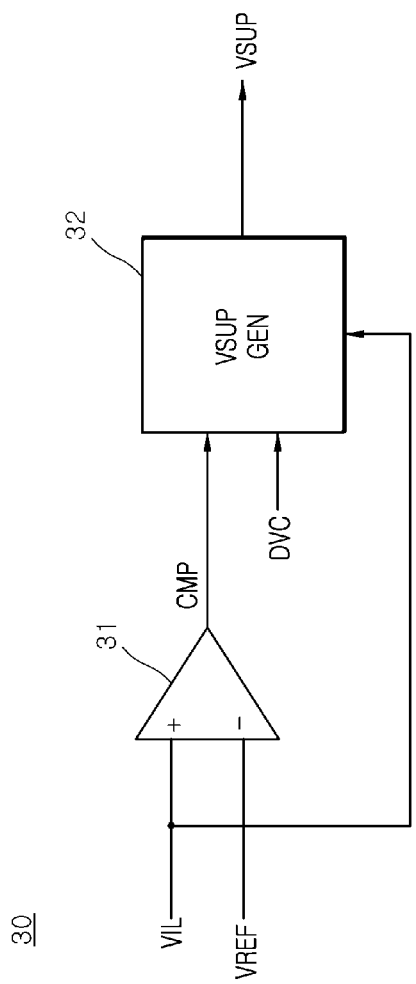
FIG. 4 is a block diagram illustrating a construction according to another embodiment of an internal voltage supply circuit that is included in the semiconductor device illustrated in FIG. 1.

FIG. 4 is a block diagram illustrating a construction according to an embodiment the internal voltage supply circuit 30 that is included in the semiconductor device 1. The internal voltage supply circuit 30 may include a comparator 31 and a supply voltage generation circuit (VSUP GEN) 32.

The comparator 31 may generate a comparison signal CMP by comparing the second input voltage VIL and a reference voltage VREF. The comparator 31 may generate the comparison signal CMP the level of which is enabled to a logic high level, when the second input voltage VIL has a higher voltage level than the reference voltage VREF having a set voltage level. The voltage level of the reference voltage VREF may be set to, for example, but not limited to, 0.96 V. The reference voltage VREF may be set to have the same voltage level as the second input voltage VIL or to have a voltage level that is higher than the voltage level of the second input voltage VIL. In an embodiment, the reference voltage VREF may be set to have the same voltage level as the second input voltage VIL or to have a voltage level that is slightly higher than the voltage level of the second input voltage VIL.

The supply voltage generation circuit 32 may generate the supply voltage VSUP when the comparison signal CMP is enabled during the interval in which the power control signal DVC is disabled. The supply voltage generation circuit 32 may generate the supply voltage VSUP by boosting or increasing the voltage level of the second input voltage VIL when the comparison signal CMP is enabled during the interval in which the power control signal DVC is disabled. The supply voltage generation circuit 32 may supply the supply voltage VSUP to the first pad 21 when the comparison signal CMP is enabled during the interval in which the power control signal DVC is disabled.

Figure 5:
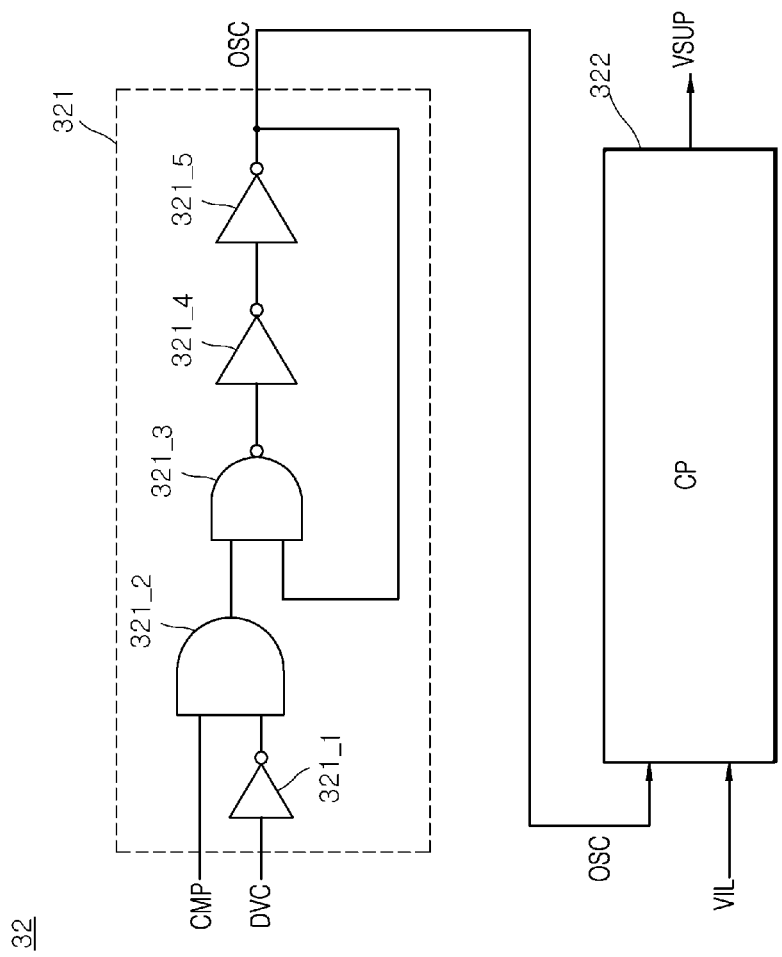
FIG. 5 is a diagram illustrating a construction according to an embodiment of a supply voltage generation circuit that is included in the internal voltage supply circuit illustrated in FIG. 4.

FIG. 5 is a diagram illustrating a construction according to an embodiment of the supply voltage generation circuit 32 that is included in the internal voltage supply circuit 30. The supply voltage generation circuit 32 may include a period signal generation circuit 321 and a charge pump (CP) 322.

The period signal generation circuit 321 may be implemented by using inverters 321_1, 3214, and 3215, an AND gate 321_2, and an NAND gate 321_3. The period signal generation circuit 321 may generate a period signal OSC that is periodically toggled when the comparison signal CMP is enabled during the interval in which the power control signal DVC is disabled. The period signal generation circuit 321 may generate the period signal OSC that is periodically toggled because the NAND gate 321_3 and the inverters 321_4 and 321_5 are implemented as a ring oscillator when the level of the comparison signal CMP is enabled to a logic high level during the interval in which the level of the power control signal DVC is disabled to a logic low level.

The charge pump 322 may generate the supply voltage VSUP by boosting or increasing the voltage level of the second input voltage VIL when a pulse of the period signal OSC is input. The charge pump 322 may boost or increase the voltage level of the second input voltage VIL by performing a pumping operation when a pulse of the period signal OSC is input. The charge pump 322 may supply the first pad 21 with the supply voltage VSUP that is generated by boosting or increasing the voltage level of the second input voltage VIL.

Figure 6:
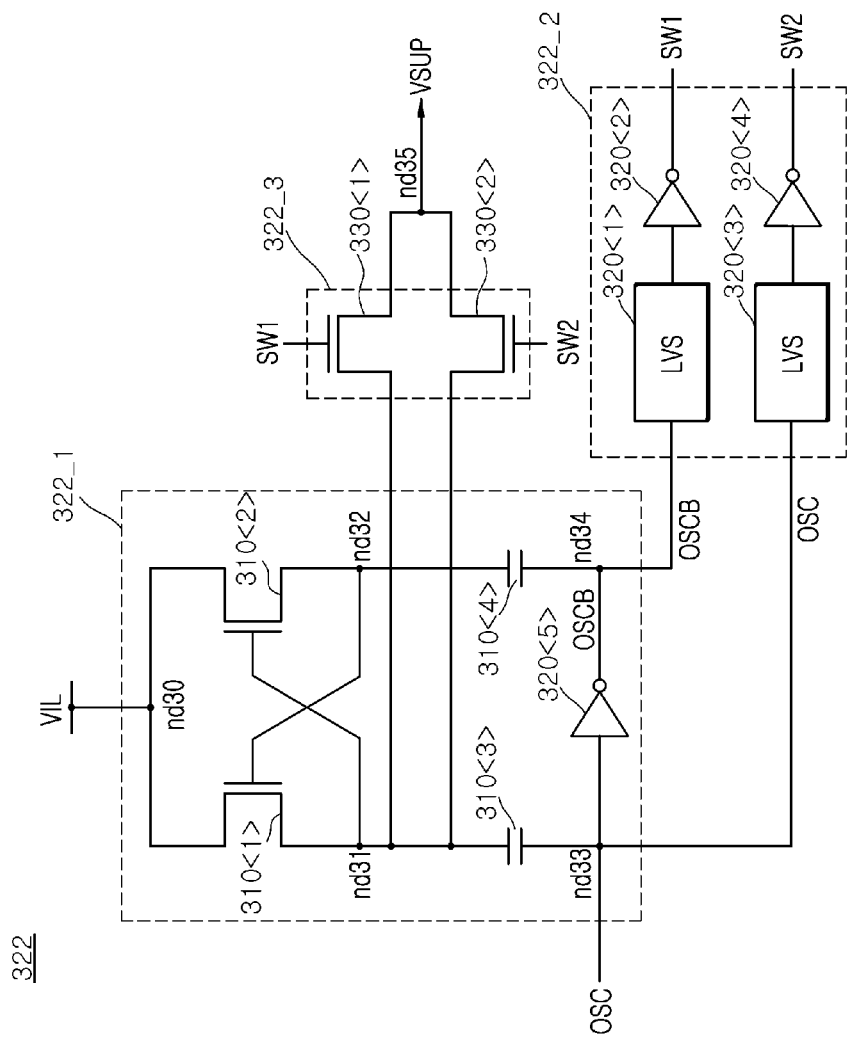
FIG. 6 is a circuit diagram illustrating a construction according to an embodiment of a charge pump that is included in the supply voltage generation circuit illustrated in FIG. 5.

FIG. 6 is a circuit diagram illustrating a construction according to an embodiment of the charge pump 322 that is included in the supply voltage generation circuit 32. The charge pump 322 may include a charge supply circuit 322_1, a switch signal generation circuit 3222, and a voltage transfer circuit 322_3.

The charge supply circuit 322_1 may be implemented by using NMOS transistors 310<1> and 310<2>, capacitors 310<3> and 310<4>, and an inverter 310<5>. The NMOS transistor 310<1> may be connected between a node nd30 to which the second input voltage VIL is applied and a node nd31, and may supply charges to the node nd31 based on a voltage level of the node nd32. The NMOS transistor 310<2> may be connected between the node nd30 to which the second input voltage VIL is applied and a node nd32, and may supply charges to the node nd32 based on a voltage level of the node nd31. The capacitor 310<3> may be connected between the node nd31 and a node nd33, and may store charges that are supplied to the node nd31. The capacitor 310<4> may be connected between the node nd32 and a node nd34, and may store charges that are supplied to the node nd32. The inverter 310<5> may be connected between the node nd33 to which the period signal OSC is applied and the node nd34, and may generate an inverted period signal OSCB by inverting the period signal OSC. The charge supply circuit 322_1 may supply charges from the second input voltage VIL to the nodes nd31 and nd32 whenever a pulse of the period signal OSC is input.

The switch signal generation circuit 322_2 may be implemented by using level shifters (LVS) 320<1> and 320<3> and inverters 320<2> and 320<4>. The level shifter 320<1> and the inverter 320<2> may generate a first switch signal SW1 by increasing the pulse width of the inverted period signal OSCB. The level shifter 320<2> and the inverter 320<4> may generate a second switch signal SW2 by increasing the pulse width of the period signal OSC. The switch signal generation circuit 322_2 may generate the first switch signal SW1 and the second switch signal SW2 having different phases and having increased pulse widths whenever a pulse of the period signal OSC is input. The pulse width of each of the period signal OSC and the inverted period signal OSCB may mean a difference between the highest voltage value and the lowest voltage value, among voltage values of each of the period signal OSC and the inverted period signal OSCB. That is, an increase in the pulse width of each of the period signal OSC and the inverted period signal OSCB may mean an increase in the difference between the highest voltage value and lowest voltage value of each of the period signal OSC and the inverted period signal OSCB.

The voltage transfer circuit 322_3 may be implemented by using NMOS transistors 330<1> and 330<2>. The NMOS transistor 330<1> may be connected between the node nd31 and a node nd35 from which the supply voltage VSUP is output, and may output charges of the node nd31 to the node nd35 whenever a pulse of the first switch signal SW1 is input. The NMOS transistor 330<1> may increase the amount of charges that is output from the node nd31 to the node nd35 as the pulse width of the first switch signal SW1 is increased. The NMOS transistor 330<2> may be connected between the node nd31 and the node nd35 from which the supply voltage VSUP is output, and may output charges of the node nd31 to the node nd35 whenever a pulse of the second switch signal SW2 is input. The NMOS transistor 330<2> may increase the amount of charges that is output from the node nd31 to the node nd35 as the pulse width of the second switch signal SW2 is increased. The voltage transfer circuit 322_3 may generate the supply voltage VSUP from charges of the node nd31 when any one of the first switch signal SW1 and the second switch signal SW2 is enabled.

Figure 7:
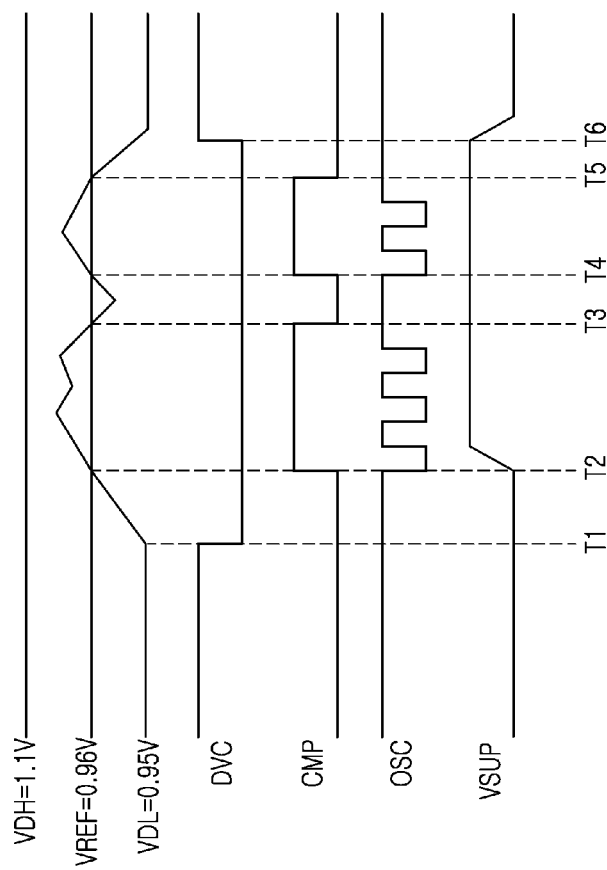
FIG. 7 is a timing diagram for describing an operation of the semiconductor device according to an embodiment of the present disclosure.

An operation of the semiconductor device 1 according to an embodiment of the present disclosure is described with reference to FIG. 7, but an operation of generating the supply voltage VSUP from a leakage current depending on whether a DVFS operation is performed and supplying the internal voltage VINT is described as follows.

Prior to a description, the power control circuit 10 may generate the first source voltage VDH having a voltage level of 1.1 V and the second source voltage VDL having a voltage level of 0.95 V by decreasing the level of the external power source VEXT that is supplied from the outside of the semiconductor device 1. At this time, the reference voltage VREF may be generated at a voltage level of 0.96 V. The first pad 21 may generate the first input voltage VIH having the voltage level of 1.1 V by receiving the first source voltage VDH having the voltage level of 1.1 V. The second pad 22 may generate the second input voltage VIL having the voltage level of 0.95 V by receiving the second source voltage VDL having the voltage level of 0.95 V.

At timing T1, when a DVFS operation is deactivated, the level of the power control signal DVC may be disabled to a logic low level.

The PMOS transistor 23_1 of the switch circuit 23 may generate the internal voltage VINT having the voltage level of 1.1 V by receiving the first input voltage VIH having the voltage level of 1.1 V. The PMOS transistor 23_3 of the switch circuit 23 may be turned off. At this time, the internal voltage VINT may be generated at the voltage level of 1.1 V, so that a leakage current is generated between the PMOS transistor 23_3 and the second pad 22 and the voltage level of the second input voltage VIL rises.

When the voltage level of the second input voltage VIL rises to 0.96 V or higher from timing T2 to timing T3, the comparator 31 may generate the comparison signal CMP the level of which is enabled to a logic high level by comparing the second input voltage VIL and the reference voltage VREF having the voltage level of 0.96 V.

The period signal generation circuit 321 of the supply voltage generation circuit 32 may generate the period signal OSC that is periodically toggled when the level of the comparison signal CMP is enabled to a logic high level during the interval in which the level of the power control signal DVC is disabled to a logic low level.

The charge pump 322 of the supply voltage generation circuit 32 may generate the supply voltage VSUP by boosting or increasing the voltage level of the second input voltage VIL when a pulse of the period signal OSC is input. The charge pump 322 may supply the first pad 21 with the supply voltage VSUP that is generated by boosting or increasing the voltage level of the second input voltage VIL.

The first pad 21 may generate the first input voltage VIH having the voltage level of 1.1 V by receiving the first source voltage VDH having the voltage level of 1.1 V and the supply voltage VSUP.

The first internal circuit 40 may perform a high speed operation by receiving the first input voltage VIH having the voltage level of 1.1 V.

The second internal circuit 50 may perform a high speed operation by receiving the internal voltage VINT having the voltage level of 1.1 V from the first source voltage VDH and the supply voltage VSUP when the DVFS operation is deactivated. That is, the first internal circuit 40 and the second internal circuit 50 may perform a high speed operation by receiving the internal voltage VINT that is generated at a high voltage level, based on the first source voltage VDH and the supply voltage VSUP that is generated from a leakage current.

At timing T3, when the voltage level of the second input voltage VIL is reduced less than 0.96 V, the comparator 31 may generate the comparison signal CMP the level of which is disabled to a logic low level by comparing the second input voltage VIL and the reference voltage VREF having the voltage level of 0.96 V.

The period signal generation circuit 321 of the supply voltage generation circuit 32 may generate the period signal OSC the level of which is fixed to a logic high level when the level of the comparison signal CMP is disabled to a logic low level during the interval in which the level of the power control signal DVC is disabled to a logic low level.

The charge pump 322 of the supply voltage generation circuit 32 might not boost or increase the voltage level of the second input voltage VIL because the level of the period signal OSC is fixed to a logic high level.

When the voltage level of the second input voltage VIL rises to 0.96 V or higher from timing T4 to timing T5, the comparator 31 may generate the comparison signal CMP the level of which is enabled to a logic high level by comparing the second input voltage VIL and the reference voltage VREF having the voltage level of 0.96 V.

The period signal generation circuit 321 of the supply voltage generation circuit 32 may generate the period signal OSC that is periodically toggled when the level of the comparison signal CMP is enabled to a logic high level during the interval in which the level of the power control signal DVC is disabled to a logic low level.

The charge pump 322 of the supply voltage generation circuit 32 may generate the supply voltage VSUP by boosting or increasing the voltage level of the second input voltage VIL when a pulse of the period signal OSC is input. The charge pump 322 may supply the first pad 21 with the supply voltage VSUP that is generated by boosting or increasing the voltage level the second input voltage VIL.

The first pad 21 may generate the first input voltage VIH having the voltage level of 1.1 V by receiving the first source voltage VDH having the voltage level of 1.1 V and the supply voltage VSUP.

The first internal circuit 40 may perform a high speed operation by receiving the first input voltage VIH having the voltage level of 1.1 V.

The second internal circuit 50 may perform a high speed operation by receiving the internal voltage VINT having the voltage level of 1.1 V from the first source voltage VDH and the supply voltage VSUP when the DVFS operation is deactivated. That is, the first internal circuit 40 and the second internal circuit 50 may perform a high speed operation by receiving the internal voltage VINT that is generated at a high voltage level, based on the first source voltage VDH and the supply voltage VSUP that is generated from a leakage current.

At timing T5, when the voltage level of the second input voltage VIL is reduced less than 0.96 V, the comparator 31 may generate the comparison signal CMP the level of which is disabled to a logic low level by comparing the second input voltage VIL and the reference voltage VREF having the voltage level of 0.96 V.

The period signal generation circuit 321 of the supply voltage generation circuit 32 may generate the period signal OSC the level of which is fixed to a logic high level when the level of the comparison signal CMP is disabled to a logic low level during the interval in which the level of the power control signal DVC is disabled to a logic low level.

The charge pump 322 of the supply voltage generation circuit 32 might not boost the second input voltage VIL because the level of the period signal OSC is fixed to a logic high level.

At timing T6, when a DVFS operation is activated, the level of the power control signal DVC may be enabled to a logic high level.

The first pad 21 may generate the first input voltage VIH having the voltage level of 1.1 V by receiving the first source voltage VDH having the voltage level of 1.1 V. The second pad 22 may generate the second input voltage VIL having the voltage level of 0.95 V by receiving the second source voltage VDL having the voltage level of 0.95 V.

The PMOS transistor 23_1 of the switch circuit 23 may be turned off. The PMOS transistor 23_3 of the switch circuit 23 may generate the internal voltage VINT having the voltage level of 0.95 V by receiving the second input voltage VIL having the voltage level of 0.95 V.

The first internal circuit 40 may perform a high speed operation by receiving the first input voltage VIH having the voltage level of 1.1 V.

The second internal circuit 50 may perform a low speed operation by receiving the internal voltage VINT having the voltage level of 0.95 V from the second source voltage VDL when the DVFS operation is activated. That is, the second internal circuit 50 may perform a low speed operation by receiving the internal voltage VINT that is generated at a low voltage level, based on the second source voltage VDL.

As described above, the semiconductor device 1 may generate the internal voltage VINT from the first source voltage VDH having a high voltage level and the supply voltage VSUP when a DVFS operation is deactivated. The semiconductor device 1 may generate the internal voltage VINT from the second source voltage VDL having a low voltage level, when a DVFS operation is activated. The semiconductor device 1 may generate the internal voltage VINT from the first source voltage VDH and the supply voltage VSUP that is generated by a leakage current, when a DVFS operation is deactivated, and may use the leakage current in the internal voltage VINT. In an embodiment, the semiconductor device 1 can reduce current consumption by selectively supplying an internal circuit with the internal voltage VINT having a high voltage level and the internal voltage VINT having a low voltage level, depending on whether a DVFS operation is performed.

Figure 8:
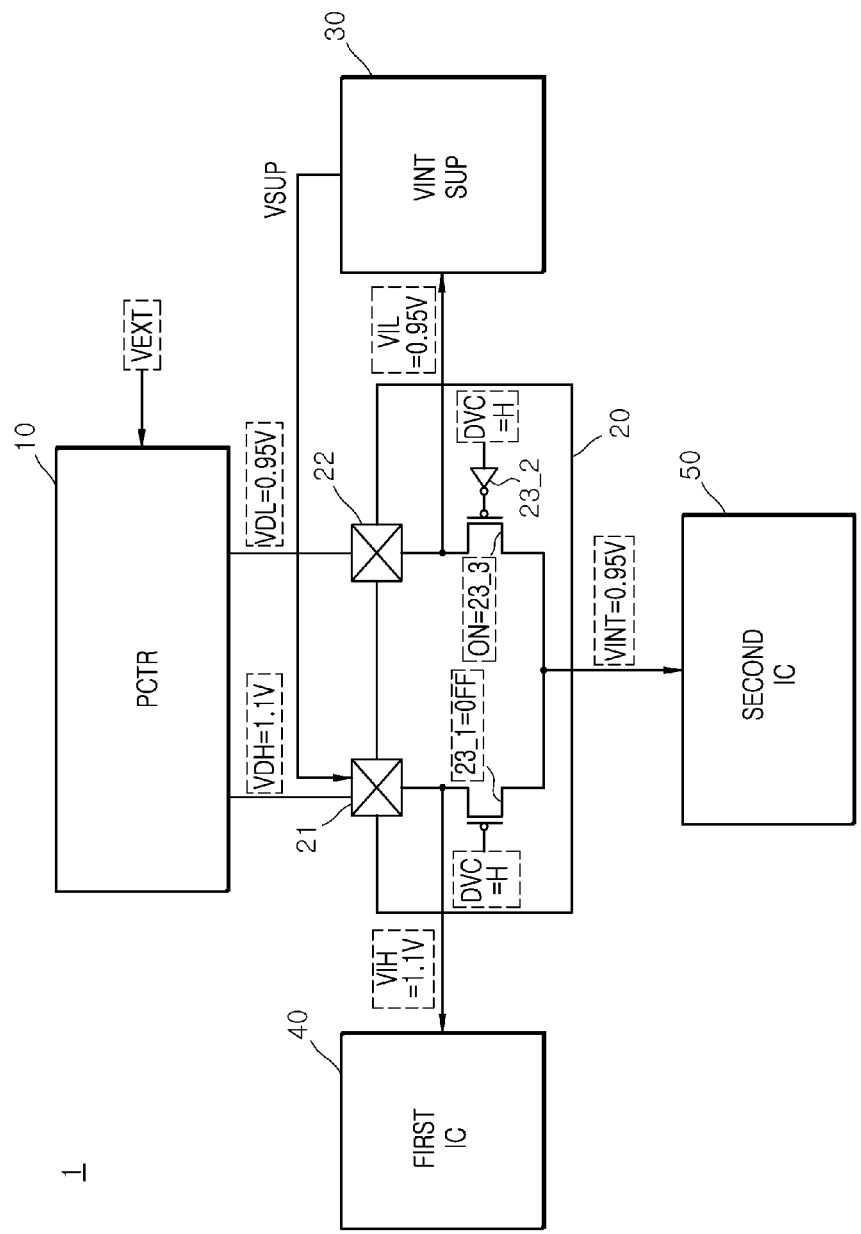
FIGS. 8 and 9 are diagrams for describing an operation of the semiconductor device according to an embodiment of the present disclosure.

An operation of a DVFS operation of the semiconductor device 1 being activated according to an embodiment of the present disclosure is described as follows with reference to FIG. 8.

The power control circuit 10 may generate the first source voltage VDH having the voltage level of 1.1 V and the second source voltage VDL having the voltage level of 0.95 V by reducing the voltage level of the external power source VEXT that is supplied from the outside.

The first pad 21 may generate the first input voltage VIH having the voltage level of 1.1 V by receiving the first source voltage VDH having the voltage level of 1.1 V.

The second pad 22 may generate the second input voltage VIL having the voltage level of 0.95 V by receiving the second source voltage VDL having the voltage level of 0.95 V.

The PMOS transistor 23_1 of the switch circuit 23 may be turned off when the power control signal DVC having a logic high level is input. The PMOS transistor 23_3 of the switch circuit 23 may be turned on when the power control signal DVC having a logic high level is input, and may generate the internal voltage VINT having the voltage level of 0.95 V by receiving the second input voltage VIL having the voltage level of 0.95 V.

The internal voltage supply circuit 30 might not generate the supply voltage VSUP because the level of the second source voltage VDL is generated at a voltage level less than 0.96 V, that is, a set voltage level.

The first internal circuit 40 may perform a high speed operation by receiving the first input voltage VIH having the voltage level of 1.1 V.

The second internal circuit 50 may perform a low speed operation by receiving the internal voltage VINT having the voltage level of 0.95 V from the second source voltage VDL when a DVFS operation is activated. That is, the second internal circuit 50 may perform a low speed operation by receiving the internal voltage VINT that is generated at a low voltage level, based on the second source voltage VDL.

Figure 9:
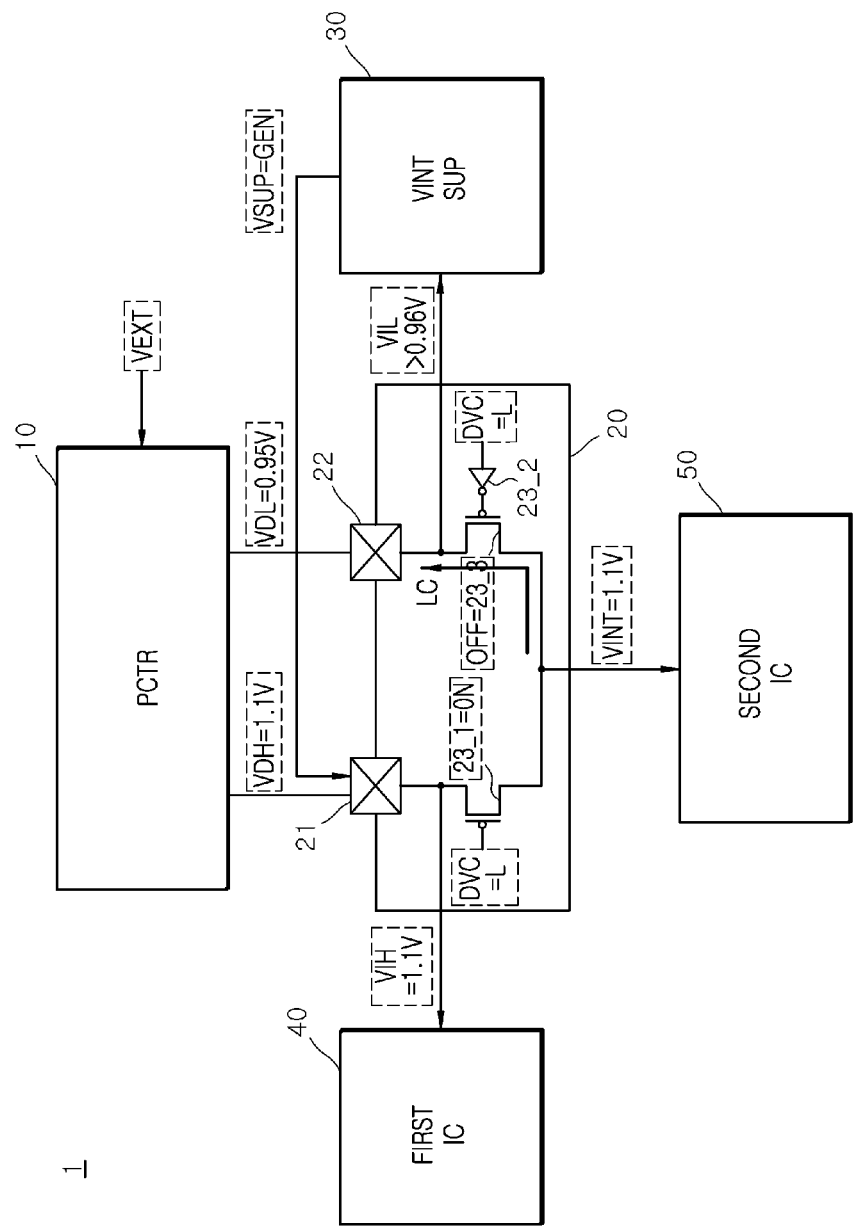

An operation of a DVFS operation of the semiconductor device 1 according to an embodiment of the present disclosure being deactivated is described as follows with reference to FIG. 9.

The power control circuit 10 may generate the first source voltage VDH having the voltage level of 1.1 V and the second source voltage VDL having the voltage level of 0.95 V by reducing the voltage level of the external power source VEXT that is supplied from the outside.

The first pad 21 may generate the first input voltage VIH having the voltage level of 1.1 V by receiving the first source voltage VDH having the voltage level of 1.1 V.

The second pad 22 may generate the second input voltage VIL having the voltage level of 0.95 V by receiving the second source voltage VDL having the voltage level of 0.95 V.

The PMOS transistor 23_1 of the switch circuit 23 may be turned on when the power control signal DVC having a logic low level is input, and may generate the internal voltage VINT having the voltage level of 1.1 V by receiving the first input voltage VIH having the voltage level of 1.1 V. The PMOS transistor 23_3 of the switch circuit 23 may be turned off when the power control signal DVC having a logic low level is input. At this time, the internal voltage VINT may be generated at the voltage level of 1.1 V, so that a leakage current LC may occur between the PMOS transistor 23_3 and the second pad 22 and the second input voltage VIL may be generated at a voltage level of 0.96 V or higher.

The internal voltage supply circuit 30 may generate the supply voltage VSUP by boosting or increasing the voltage level of the second input voltage VIL because the level of the second source voltage VDL is generated as the voltage level of 0.96 V or higher, that is, a set voltage level. The internal voltage supply circuit 30 may supply the supply voltage VSUP to the first pad 21.

The first pad 21 may generate the first input voltage VIH having the voltage level of 1.1 V by receiving the first source voltage VDH having the voltage level of 1.1 V and the supply voltage VSUP.

The first internal circuit 40 may perform a high speed operation by receiving the first input voltage VIH having the voltage level of 1.1 V.

The second internal circuit 50 may perform a high speed operation by receiving the internal voltage VINT having the voltage level of 1.1 V from the first source voltage VDH and the supply voltage VSUP when a DVFS operation is deactivated. That is, the first internal circuit 40 and the second internal circuit 50 may perform a high speed operation by receiving the internal voltage VINT that is generated at a high voltage level, based on the first source voltage VDH and the supply voltage VSUP that is generated from a leakage current.

As described above, the semiconductor device 1 may generate the internal voltage VINT from the first source voltage VDH having a high voltage level and the supply voltage VSUP when a DVFS operation is deactivated. The semiconductor device 1 may generate the internal voltage VINT from the second source voltage VDL having a low voltage level when a DVFS operation is activated. The semiconductor device 1 may generate the internal voltage VINT from the first source voltage VDH and the supply voltage VSUP that is generated by a leakage current, when a DVFS operation is deactivated, and may use the leakage current in the internal voltage VINT. In an embodiment, the semiconductor device 1 can reduce current consumption by selectively supplying the internal circuit with the internal voltage VINT having a high voltage level and the internal voltage VINT having a low voltage level depending on whether a DVFS operation is performed.

Figure 10:
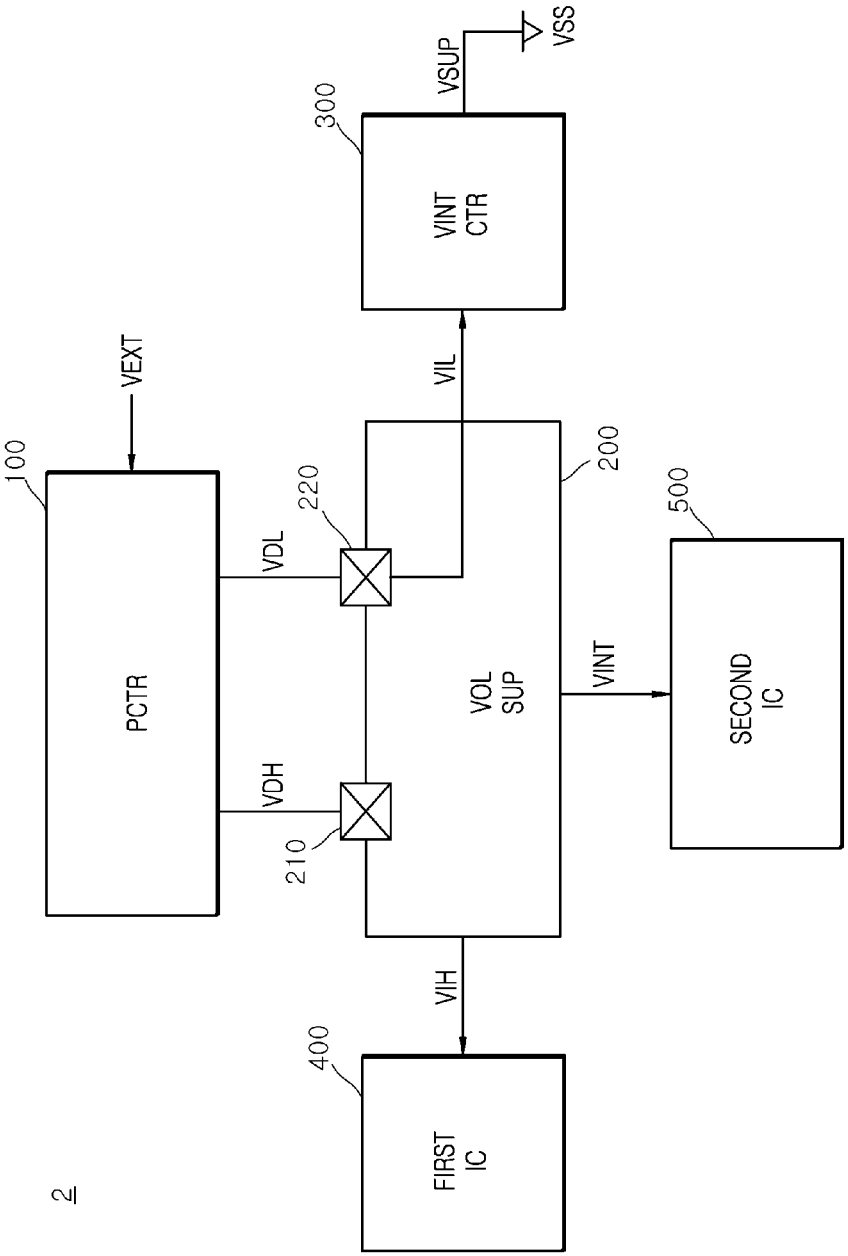
FIG. 10 is a block diagram illustrating a construction of a semiconductor device according to another embodiment of the present disclosure.

As illustrated in FIG. 10, a semiconductor device 2 according to another embodiment of the present disclosure may include a power control circuit (PCTR) 100, a voltage supply circuit (VOL SUP) 200, an internal voltage control circuit (VINT CTR) 300, a first internal circuit (FIRST IC) 400, and a second internal circuit (SECOND IC) 500.

The power control circuit 100 may generate a first source voltage VDH and a second source voltage VDL from an external power source VEXT that is supplied from the outside of the semiconductor device. The power control circuit 100 may generate the first source voltage VDH and the second source voltage VDL by reducing the level of the external power source VEXT that is supplied from the outside. The first source voltage VDH may be set as a voltage that is supplied in order for the semiconductor device 2 to perform a high speed operation. The second source voltage VDL may be set as a voltage that is supplied in order for the semiconductor device 2 to perform a low speed operation. The first source voltage VDH may be set as a voltage that is supplied at, for example but not limited to, a voltage level of 1.1 V in order for the semiconductor device 2 to perform a high speed operation. The second source voltage VDL may be set as a voltage that is supplied, for example but not limited to, as 0.95 V in order for the semiconductor device 2 to perform a low speed operation. The first source voltage VDH may be generated as a voltage having a voltage level that is greater than or equal to the second source voltage VDL. In some embodiments, the first source voltage VDH and the second source voltage VDL may be generated to have various voltage levels.

The voltage supply circuit 200 may include a first pad 210 and a second pad 220. The first pad 210 may receive the first source voltage VDH. The second pad 220 may receive the second source voltage VDL. The voltage supply circuit 200 may generate a first input voltage VIH by receiving the first source voltage VDH through the first pad 210. The voltage supply circuit 200 may supply the first input voltage VIH to the first internal circuit 400. The voltage supply circuit 200 may generate a second input voltage VIL by receiving the second source voltage VDL through the second pad 220. The voltage supply circuit 200 may supply the second input voltage VIL to the internal voltage control circuit 300. The voltage supply circuit 200 may generate an internal voltage VINT based on at least any one of the first source voltage VDH and the second source voltage VDL. The voltage supply circuit 200 may supply the internal voltage VINT to the second internal circuit 500. The voltage supply circuit 200 may generate the internal voltage VINT based on the first source voltage VDH when a DVFS operation is deactivated. The voltage supply circuit 200 may generate the internal voltage VINT based on the second source voltage VDL when a DVFS operation is activated. The DVFS operation may be set as an operation of selectively supplying a high source voltage and a low source voltage to the second internal circuit 500 depending on an operating frequency of the second internal circuit 500 that is included in the semiconductor device 2. The voltage supply circuit 200 may generate the internal voltage VINT based on the first source voltage VDH having a high voltage level, when a DVFS operation is deactivated, and may supply the internal voltage VINT to the second internal circuit 500. The voltage supply circuit 200 may generate the internal voltage VINT based on the second source voltage VDL having a low voltage level, when a DVFS operation is activated, and may supply the internal voltage VINT to the second internal circuit 500. The voltage supply circuit 200 may be implemented as the same circuit as the voltage supply circuit 20 illustrated in FIGS. 1 to 3 and may perform the same operation as the voltage supply circuit 20, and a detailed description thereof will be omitted.

If the level of the second source voltage VDL is a set voltage level or higher when the internal voltage VINT is generated based on the first source voltage VDH, the internal voltage control circuit 300 may discharge, to a ground voltage VSS, charges that are supplied to the second source voltage VDL. If the level of the second source voltage VDL is a set voltage level or higher when a DVFS operation is deactivated, the internal voltage control circuit 300 may discharge, to the ground voltage VSS, charges that are supplied to the second source voltage VDL. If the level of the second input voltage VIL that is generated from the second source voltage VDL is a set voltage level or higher when a DVFS operation is deactivated, the internal voltage control circuit 300 may discharge, to the ground voltage VSS, charges that are supplied to the second input voltage VIL. During an operation of the internal voltage control circuit 300 generating the internal voltage VINT from the first source voltage VDH, the voltage level of the second pad 202 may rise by a leakage current. If the voltage level of the second pad 220 rises by the leakage current and the level of the second input voltage VIL that is generated from the second source voltage VDL is a set voltage level or higher, the internal voltage control circuit 300 may discharge, to the ground voltage VSS, charges that are supplied to the second input voltage VIL.

The first internal circuit 400 may be implemented as a memory circuit that performs an operation by receiving the first input voltage VIH. The first internal circuit 400 may perform a high speed operation by receiving the first input voltage VIH regardless of a DVFS operation.

The second internal circuit 500 may be implemented as a memory circuit that performs an operation by receiving the internal voltage VINT. The second internal circuit 500 may perform an operation by receiving the internal voltage VINT that is generated from the first source voltage VDH, when a DVFS operation is deactivated. The second internal circuit 500 may perform a high speed operation by receiving the internal voltage VINT that is generated at a high voltage level from the first source voltage VDH when a DVFS operation is deactivated. The second internal circuit 500 may perform an operation by receiving the internal voltage VINT that is generated from the second source voltage VDL, when a DVFS operation is activated. The second internal circuit 500 may perform a low speed operation by receiving the internal voltage VINT that is generated at a low voltage level from the second source voltage VDL when a DVFS operation is activated.

As described above, the semiconductor device 2 may generate the internal voltage VINT from the first source voltage VDH having a high voltage level, when a DVFS operation is deactivated. The semiconductor device 2 may generate the internal voltage VINT from the second source voltage VDL having a low voltage level, when a DVFS operation is activated. In an embodiment, if the level of the second source voltage VDL that is generated by a leakage current is generated at a set voltage level or higher when a DVFS operation is deactivated, the semiconductor device 2 can prevent or mitigate an abnormal operation by discharging, to the ground voltage VSS, charges that are supplied to the second source voltage VDL. In an embodiment, the semiconductor device 2 can reduce current consumption by selectively supplying an internal circuit with the internal voltage VINT having a high voltage level and the internal voltage VINT having a low voltage level, depending on whether a DVFS operation is performed.

Figure 11:
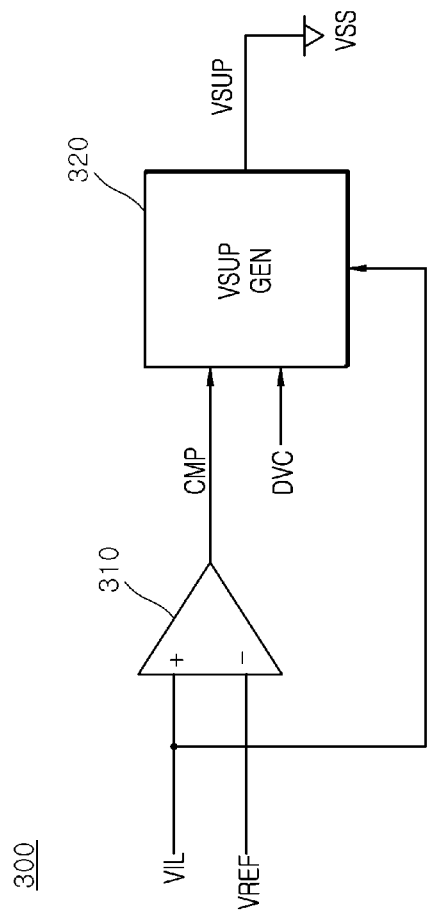
FIG. 11 is a block diagram illustrating a construction according to an embodiment of an internal voltage control circuit that is included in the semiconductor device illustrated in FIG. 10.

FIG. 11 is a block diagram illustrating a construction according to an embodiment of the internal voltage control circuit 300 that is included in the semiconductor device 2. The internal voltage control circuit 300 may include a comparator 310 and a supply voltage generation circuit (VSUP GEN) 320.

The comparator 310 may generate a comparison signal CMP by comparing the second input voltage VIL and a reference voltage VREF. The comparator 310 may generate the comparison signal CMP the level of which is enabled to a logic high level, when the second input voltage VIL has a higher voltage level than the reference voltage VREF having a set voltage level. The voltage level of the reference voltage VREF may be set to, for example but not limited to, 0.96 V. The reference voltage VREF may be set to have the same voltage level as the second input voltage VIL or to have a voltage level that is higher than the voltage level of the second input voltage VIL. In an embodiment, the reference voltage VREF may be set to have the same voltage level as the second input voltage VIL or to have a voltage level that is slightly higher than the voltage level of the second input voltage VIL.

The supply voltage generation circuit 320 may generate the supply voltage VSUP when the comparison signal CMP is enabled during the interval in which the power control signal DVC is disabled. The supply voltage generation circuit 320 may generate the supply voltage VSUP by boosting or increasing the voltage level of the second input voltage VIL when the comparison signal CMP is enabled during the interval in which the power control signal DVC is disabled. When the comparison signal CMP is enabled during the interval in which a power control signal DVC is disabled, the supply voltage generation circuit 320 may connect the supply voltage VSUP to the ground voltage VSS through a resistor (325_1 in FIG. 12). When the comparison signal CMP is enabled during the interval in which the power control signal DVC is disabled, the supply voltage generation circuit 320 may discharge, to the ground voltage VSS, charges that are supplied to the supply voltage VSUP through the resistor (325_1 in FIG. 12).

Figure 12:
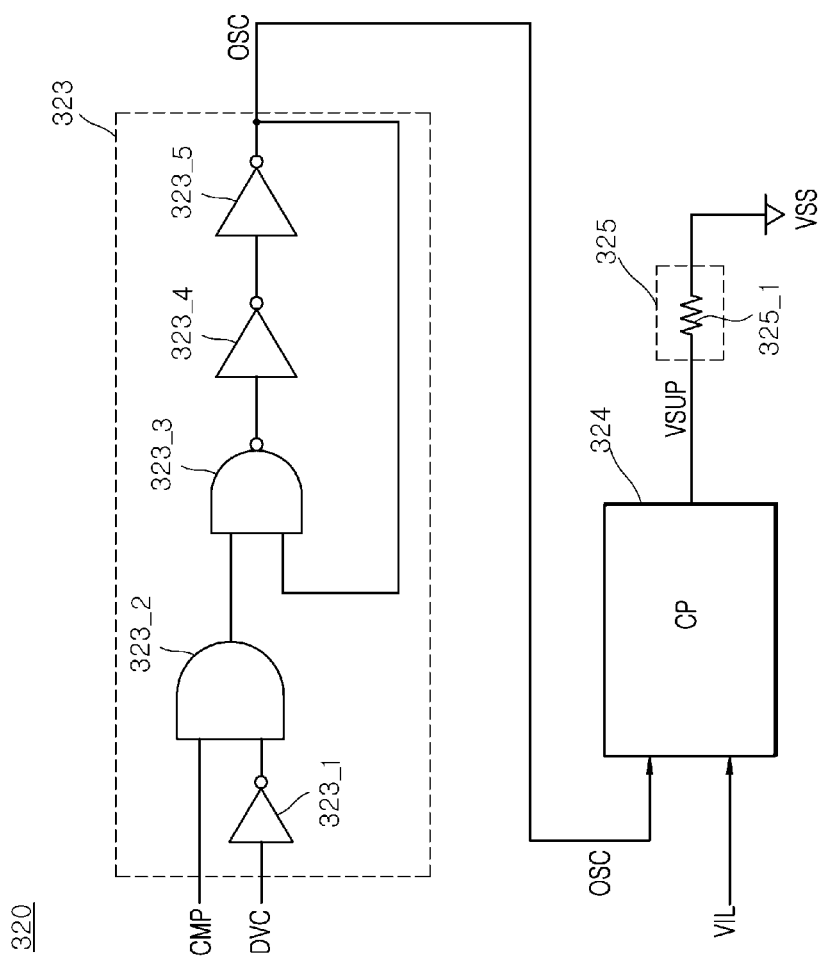
FIG. 12 is a diagram illustrating a construction according to an embodiment of a supply voltage generation circuit that is included in the internal voltage control circuit illustrated in FIG. 11.

FIG. 12 is a diagram illustrating a construction according to an embodiment of the supply voltage generation circuit 320 that is included in the internal voltage control circuit 300. The supply voltage generation circuit 320 may include a period signal generation circuit 323, a charge pump (CP) 324, and a discharge circuit 325.

The period signal generation circuit 323 may be implemented by using inverters 323_1, 3234, and 3235, an AND gate 3232, and a NAND gate 323_3. The period signal generation circuit 323 may generate a period signal OSC that is periodically toggled when the comparison signal CMP is enabled during the interval in which the power control signal DVC is disabled. The period signal generation circuit 323 may generate the period signal OSC that is periodically toggled because the NAND gate 323_3 and the inverters 323_4 and 323_5 are implemented as a ring oscillator when the level of the comparison signal CMP is enabled to a logic high level during the interval in which the level of the power control signal DVC is disabled to a logic low level.

The charge pump 324 may generate the supply voltage VSUP by boosting or increasing the voltage level of the second input voltage VIL when a pulse of the period signal OSC is input. The charge pump 324 may generate the supply voltage VSUP by boosting or increasing the voltage level of the second input voltage VIL by performing a pumping operation when the pulse of the period signal OSC is input.

The discharge circuit 325 may be implemented as the resistor 325_1 that is connected between a node from which the supply voltage VSUP is output and the ground voltage VSS. The discharge circuit 325 may connect the supply voltage VSUP and the ground voltage VSS through the resistor 325_1. The discharge circuit 325 may discharge charges of the supply voltage VSUP to the ground voltage VSS through the resistor 325_1.

Figure 13:
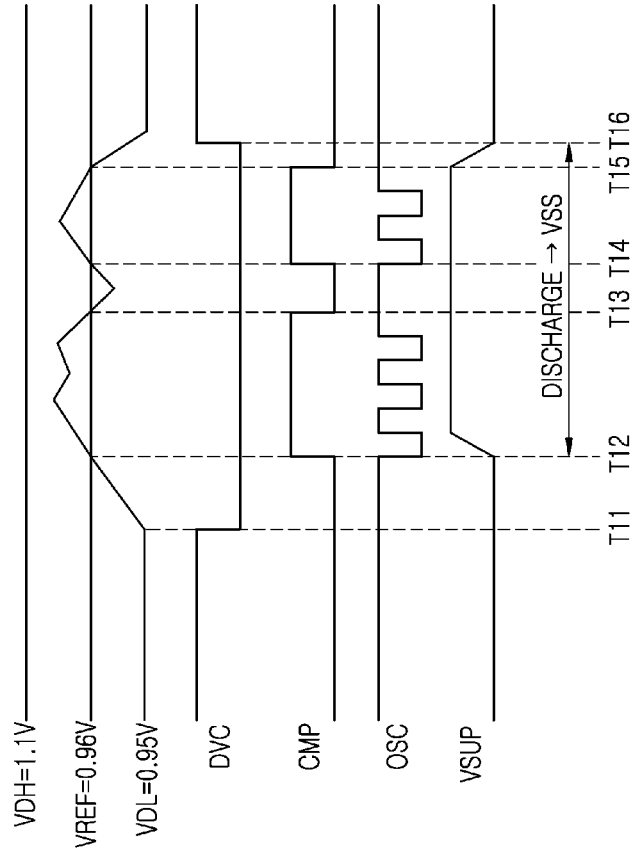
FIG. 13 is a timing diagram for describing an operation of the semiconductor device according to another embodiment of the present disclosure.

An operation of the semiconductor device 2 according to an embodiment of the present disclosure is described with reference to FIG. 13, but an operation of supplying the internal voltage VINT that is generated depending on whether a DVFS operation is performed and connecting, to the ground voltage VSS, the supply voltage VSUP that is generated from a leakage current is described as follows.

Prior to a description, the power control circuit 100 may generate the first source voltage VDH having the voltage level of 1.1 V and the second source voltage VDL having the voltage level of 0.95 V by reducing the level of the external power source VEXT that is supplied from the outside. At this time, the reference voltage VREF may be generated at the voltage level of 0.96 V. The first pad 210 may generate the first input voltage VIH having the voltage level of 1.1 V by receiving the first source voltage VDH having the voltage level of 1.1 V. The second pad 220 may generate the second input voltage VIL having the voltage level of 0.95 V by receiving the second source voltage VDL having the voltage level of 0.95 V.

At timing T11, when a DVFS operation is deactivated, the level of the power control signal DVC may be disabled to a logic low level.

The voltage supply circuit 200 may generate the internal voltage VINT having the voltage level of 1.1 V by receiving the first input voltage VIH having the voltage level of 1.1 V. At this time, the internal voltage VINT may be generated at the voltage level of 1.1 V, so that a leakage current occurs and the voltage level of the second input voltage VIL rises. In this case, an operation of the leakage current occurring is the same as the operation of the leakage current occurring between the PMOS transistor 23_3 and the second pad 22, which has been described with reference to FIG. 7, and a detailed description thereof will be omitted.

When the voltage level of the second input voltage VIL rises to 0.96 V or higher from timing T12 to timing T13, the comparator 310 may generate the comparison signal CMP the level of which is enabled to a logic high level by comparing the second input voltage VIL and the reference voltage VREF having the voltage level of 0.96 V.

The period signal generation circuit 323 of the supply voltage generation circuit 320 may generate the period signal OSC that is periodically toggled, when the level of the comparison signal CMP is enabled to a logic high level during the interval in which the level of the power control signal DVC is disabled to a logic low level.

The charge pump 324 of the supply voltage generation circuit 320 may generate the supply voltage VSUP by boosting or increasing the voltage level the second input voltage VIL when a pulse of the period signal OSC is input.

The discharge circuit 325 of the supply voltage generation circuit 320 may connect the supply voltage VSUP and the ground voltage VSS through the resistor 325_1. The discharge circuit 325 may discharge charges of the supply voltage VSUP to the ground voltage VSS through the resistor 325_1. At this time, the voltage level of the supply voltage VSUP rises to 0.96 V, and the supply voltage VSUP may maintain the voltage level of 0.96 V by the charges that are discharged.

The first internal circuit 400 may perform a high speed operation by receiving the first input voltage VIH having the voltage level of 1.1 V.

The second internal circuit 500 may perform a high speed operation by receiving the internal voltage VINT having the voltage level of 1.1 V from the first source voltage VDH when a DVFS operation is deactivated. That is, the first internal circuit 400 and the second internal circuit 500 may perform a high speed operation by receiving the internal voltage VINT that is generated at a high voltage level, based on the first source voltage VDH.

At timing T13, when the voltage level of the second input voltage VIL is reduced less than 0.96 V, the comparator 31 may generate the comparison signal CMP the level of which is disabled to a logic low level by comparing the second input voltage VIL and the reference voltage VREF having the voltage level of 0.96 V.

The period signal generation circuit 323 of the supply voltage generation circuit 320 may generate the period signal OSC the level of which is fixed to a logic high level, when the level of the comparison signal CMP is disabled to a logic low level during the interval in which the level of the power control signal DVC is disabled to a logic low level.

The charge pump 324 of the supply voltage generation circuit 320 might not boost or increase the voltage level of the second input voltage VIL because the level of the period signal OSC is fixed to a logic high level.

The discharge circuit 325 of the supply voltage generation circuit 320 may connect the supply voltage VSUP and the ground voltage VSS through the resistor 325_1.

When the voltage level of the second input voltage VIL rises to 0.96 V or higher from timing T14 to timing T15, the comparator 310 may generate the comparison signal CMP the level of which is enabled to a logic high level by comparing the second input voltage VIL and the reference voltage VREF having the voltage level of 0.96 V.

The period signal generation circuit 321 of the supply voltage generation circuit 32 may generate the period signal OSC that is periodically toggled when the level of the comparison signal CMP is enabled to a logic high level during the interval in which the level of the power control signal DVC is disabled to a logic low level.

The charge pump 324 of the supply voltage generation circuit 320 may generate the supply voltage VSUP by boosting or increasing the voltage level of the second input voltage VIL when a pulse of the period signal OSC is input.

The discharge circuit 325 of the supply voltage generation circuit 320 may connect the supply voltage VSUP and the ground voltage VSS through the resistor 325_1. The discharge circuit 325 may discharge charges of the supply voltage VSUP to the ground voltage VSS through the resistor 325_1. At this time, the voltage level of the supply voltage VSUP may rise to 0.96 V, and the supply voltage VSUP may maintain the voltage level of 0.96 V by the charges that are discharged.

The first internal circuit 400 may perform a high speed operation by receiving the first input voltage VIH having the voltage level of 1.1 V.

The second internal circuit 500 may perform a high speed operation by receiving the internal voltage VINT having the voltage level of 1.1 V from the first source voltage VDH when a DVFS operation is deactivated. That is, the first internal circuit 400 and the second internal circuit 500 may perform a high speed operation by receiving the internal voltage VINT that is generated at a high voltage level, based on the first source voltage VDH.

At timing T15, when the voltage level of the second input voltage VIL is reduced less than 0.96 V, the comparator 310 may generate the comparison signal CMP the level of which is disabled to a logic low level by comparing the second input voltage VIL and the reference voltage VREF having the voltage level of 0.96 V.

The period signal generation circuit 323 of the supply voltage generation circuit 320 may generate the period signal OSC the level of which is fixed to a logic high level, when the level of the comparison signal CMP is disabled to a logic low level during the interval in which the level of the power control signal DVC is disabled to a logic low level.

The charge pump 324 of the supply voltage generation circuit 320 might not boost or increase the voltage level of the second input voltage VIL because the level of the period signal OSC is fixed to a logic high level.

The discharge circuit 325 of the supply voltage generation circuit 320 may connect the supply voltage VSUP and the ground voltage VSS through the resistor 325_1. The discharge circuit 325 may discharge charges of the supply voltage VSUP to the ground voltage VSS through the resistor 325_1. At this time, the level of the supply voltage VSUP may be decreased. For example, the level of the supply voltage VSUP having the voltage level of 0.95V decreases to the level of the ground voltage VSS as time passes.

At timing T16, when the DVFS operation is activated, the level of the power control signal DVC may be enabled to a logic high level.

The first pad 210 may generate the first input voltage VIH having the voltage level of 1.1 V by receiving the first source voltage VDH having the voltage level of 1.1 V. The second pad 220 may generate the second input voltage VIL having the voltage level of 0.95 V by receiving the second source voltage VDL having the voltage level of 0.95 V.

The voltage supply circuit 200 may generate the internal voltage VINT having the voltage level of 0.95 V by receiving the second input voltage VIL having the voltage level of 0.95 V.

The first internal circuit 400 may perform a high speed operation by receiving the first input voltage VIH having the voltage level of 1.1 V.

The second internal circuit 500 may perform a low speed operation by receiving the internal voltage VINT having the voltage level of 0.95 V from the second source voltage VDL when a DVFS operation is activated. That is, the second internal circuit 500 may perform a low speed operation by receiving the internal voltage VINT that is generated at a low voltage level, based on the second source voltage VDL.

As described above, the semiconductor device 2 may generate the internal voltage VINT from the first source voltage VDH having a high voltage level when a DVFS operation is deactivated. The semiconductor device 2 may generate the internal voltage VINT from the second source voltage VDL having a low voltage level when a DVFS operation is activated. In an embodiment, the semiconductor device 2 can prevent or mitigate an abnormal operation by fixing the level of the second source voltage VDL to the level of the ground voltage VSS, if the level of the second source voltage VDL that is generated by a leakage current is generated at a set voltage level or higher when a DVFS operation is deactivated. In an embodiment, the semiconductor device 2 can reduce current consumption by selectively supplying an internal circuit with the internal voltage VINT having a high voltage level and the internal voltage VINT having a low voltage level depending on whether a DVFS operation is performed.

What is claimed is:

1. A semiconductor device comprising:
    a voltage supply circuit comprising a first pad to which a first source voltage that is generated from an external power source is applied and a second pad to which a second source voltage that is generated from the external power source is applied and configured to generate an internal voltage based on at least one of the first source voltage and the second source voltage; and
    an internal voltage supply circuit configured to generate the internal voltage by supplying less than all of the second source voltage to the first source voltage when a level of the second source voltage is a set voltage level or higher, when generating the internal voltage based on the first source voltage, and
    wherein the internal voltage supply circuit is configured to:
    generate a supply voltage by increasing a voltage level of a second input voltage that is generated from the second source voltage through a charge pump; and
    supply the supply voltage to the first pad.

2. The semiconductor device of claim 1, wherein the first source voltage is a voltage having a voltage level that is greater than or equal to a voltage level of the second source voltage.

3. The semiconductor device of claim 1, wherein:
    the first pad is configured to output a first input voltage by receiving the first source voltage and the supply voltage that is generated from less than all of the second source voltage; and
    the second pad is configured to output the second input voltage by receiving the second source voltage.

4. The semiconductor device of claim 1, wherein the voltage supply circuit further comprises a switch circuit configured to generate the internal voltage by receiving a first input voltage from the first pad or configured to generate the internal voltage by receiving the second input voltage from the second pad, based on a logic level of a power control signal.

5. The semiconductor device of claim 1, wherein the internal voltage supply circuit comprises:
    a comparator configured to generate a comparison signal by comparing the second input voltage that is generated by receiving the second source voltage through the second pad and a reference voltage having the set voltage level; and
    a supply voltage generation circuit configured to generate the supply voltage by increasing a voltage level of the second input voltage when the comparison signal is enabled during an interval in which a power control signal is disabled.

6. The semiconductor device of claim 5, wherein the supply voltage generation circuit comprises:
    a period signal generation circuit configured to generate a period signal that is periodically toggled when the comparison signal is enabled during the interval in which the power control signal is disabled; and
    the charge pump configured to generate the supply voltage by increasing a voltage level of the second input voltage when a pulse of the period signal is input and configured to supply the supply voltage to the first pad.

7. The semiconductor device of claim 6, wherein the charge pump comprises:

a charge supply circuit configured to supply charges from the second input voltage to the first node whenever a pulse of the period signal is input;

a switch signal generation circuit configured to generate a first switch signal and a second switch signal phases of which are differently generated whenever a pulse of the period signal is input; and a voltage transfer circuit configured to generate the supply voltage from the charges of the first node when any one of the first switch signal and the second switch signal is enabled.

8. A semiconductor device comprising:

a voltage supply circuit comprising a first pad to which a first source voltage is applied and a second pad to which a second source voltage is applied and configured to supply an internal circuit with an internal voltage that is generated based on one of the first source voltage and the second source voltage; and an internal voltage supply circuit configured to detect the second source voltage according to a dynamic voltage frequency scaling (DVFS) operation and configured to supply less than all of the second source voltage to the first source voltage when a level of the second source voltage is a set voltage level or higher, and wherein the internal voltage supply circuit is configured to:

generate a supply voltage by increasing a voltage level of a second input voltage that is generated from the second source voltage through a charge pump; and supply the supply voltage to the first pad.

9. The semiconductor device of claim 8, wherein the voltage supply circuit is configured to:

generate the internal voltage based on the first source voltage and the part of the second source voltage when the DVFS operation is deactivated; and supply the internal voltage to the internal circuit.

10. The semiconductor device of claim 8, wherein the voltage supply circuit is configured to:

generate the internal voltage based on the second source voltage when the DVFS operation is activated; and supply the internal voltage to the internal circuit.

11. The semiconductor device of claim 8, wherein the internal voltage supply circuit is configured to:

detect the second source voltage when the DVFS operation is deactivated; and supply less than all of the second source voltage to the first source voltage when the level of the second source voltage is the set voltage level or higher.

12. The semiconductor device of claim 8, wherein the voltage supply circuit further comprises a switch circuit configured to generate the internal voltage by receiving a first input voltage and less than all of the second source voltage from the first pad in response to a power control signal that is disabled when a DVFS operation is deactivated and configured to generate the internal voltage by receiving the second input voltage from the second pad when the power control signal is enabled.

13. The semiconductor device of claim 8, wherein the internal voltage supply circuit comprises:

a comparator configured to generate a comparison signal by comparing the second input voltage that is generated by receiving the second source voltage through the second pad and a reference voltage having the set voltage level; and a supply voltage generation circuit configured to generate the supply voltage by increasing a voltage level of the second input voltage when the comparison signal is enabled during an interval in which a power control signal is disabled.

14. The semiconductor device of claim 13, wherein the supply voltage generation circuit comprises:

a period signal generation circuit configured to generate a period signal that is periodically toggled when the comparison signal is enabled during an interval in which the power control signal is disabled; and a supply voltage generation circuit configured to generate the supply voltage by increasing a voltage level of the second input voltage when the comparison signal is enabled during an interval in which a power control signal is disabled.

15. The semiconductor device of claim 14, wherein the charge pump comprises:

a charge supply circuit configured to supply charges from the second input voltage to the first node whenever a pulse of the period signal is input;

a switch signal generation circuit configured to generate a first switch signal and a second switch signal phases of which are differently generated whenever a pulse of the period signal is input; and a voltage transfer circuit configured to generate the supply voltage from the charges of the first node when any one of the first switch signal and the second switch signal is enabled.

* * * * *